(12) United States Patent
Diprose et al.

(10) Patent No.: US 12,740,555 B2
(45) **Date of Patent: *Sep. 22, 2026**

(54) APPARATUS AND METHOD FOR ELECTRICALLY KILLING PLANTS

(71) Applicant: Ubiqutek Ltd., Warwickshire (GB)

(72) Inventors: Andrew Diprose, London (GB); Pravin Iyengar, Banbury (GB)

(73) Assignee: Ubiqutek Ltd., Warwickshire (GB)

(*) Notice: Subject to any disclaimer, the term of this patent is extended or adjusted under 35 U.S.C. 154(b) by 584 days.

This patent is subject to a terminal disclaimer.

(21) Appl. No.: 18/270,717

(22) PCT Filed: Dec. 29, 2021

(86) PCT No.: PCT/EP2021/087757

§ 371 (c)(1),
(2) Date: Jun. 30, 2023

(87) PCT Pub. No.: WO2022/144371

PCT Pub. Date: Jul. 7, 2022

(65) Prior Publication Data

US 2024/0074429 A1 Mar. 7, 2024

(30) Foreign Application Priority Data

Dec. 30, 2020 (EP) .................................... 20217936

(51) Int. Cl.
*A01M 21/04* (2006.01)
*H02M 11/00* (2006.01)

(52) U.S. Cl.
CPC .......... *A01M 21/046* (2013.01); *H02M 11/00* (2013.01)

(58) Field of Classification Search
CPC .................................................. A01M 21/046
See application file for complete search history.

(56) References Cited

U.S. PATENT DOCUMENTS 4,338,743 A 7/1982 Gilmore
12,329,144 B2 * 6/2025 Diprose .............. A01M 21/046
(Continued)

FOREIGN PATENT DOCUMENTS

DE 102024004462 A1 * 8/2025 ................ H02J 1/06
EP 3557750 A1 10/2019
(Continued)

OTHER PUBLICATIONS

PCT International Search Report and Written Opinion; International Application No. PCT/EP2021/087757; International Filing Date Dec. 29, 2021; 23 pages.

*Primary Examiner* — Christopher P Ellis
(74) *Attorney, Agent, or Firm* — Umberg Zipser LLP; Ryan Dean

(57) ABSTRACT

Electrical apparatus to kill a plant or at least attenuate plant growth, the apparatus comprising: an electrical energy supply unit; a applicator unit comprising an applicator electrode; a return unit comprising a return electrode; the electrical energy supply unit arranged to apply electrical energy through a transmission circuit comprising the applicator electrode, and the return electrode, the electrical energy supply unit including a plurality of transformers, each transformer having a low voltage side and a high voltage side, wherein the high voltage sides of the transformers are electrically connected to implement transmission circuit, and/or the low voltage sides of the transformers are electrically connected.

25 Claims, 8 Drawing Sheets

(56) References Cited

U.S. PATENT DOCUMENTS

| | | | | |
|---|---|---|---|---|
| 2006/0265946 | A1 | 11/2006 | Schwager et al. | |
| 2010/0324549 | A1 | 12/2010 | Marion | |
| 2021/0169064 | A1 * | 6/2021 | Fox | A01B 47/00 |

FOREIGN PATENT DOCUMENTS

| | | | | | |
|---|---|---|---|---|---|
| EP | 4039091 | A1 * | 8/2022 | | E01H 11/00 |
| GB | 2609642 | A | 2/2023 | | |
| WO | WO-2014161059 | A1 * | 10/2014 | | H05C 1/02 |
| WO | 2016162667 | A1 | 10/2016 | | |
| WO | 2019052591 | A1 | 3/2019 | | |
| WO | 2020177919 | A2 | 9/2020 | | |
| WO | 2020182818 | A1 | 9/2020 | | |
| WO | 2020182829 | A1 | 9/2020 | | |
| WO | WO-2021233892 | A1 * | 11/2021 | | A01M 21/046 |
| WO | WO-2023178398 | A1 * | 9/2023 | | H02M 3/33571 |
| WO | WO-2025171450 | A1 * | 8/2025 | | A01M 21/046 |
| WO | WO-2025196306 | A1 * | 9/2025 | | A01B 47/00 |

* cited by examiner

APPARATUS AND METHOD FOR ELECTRICALLY KILLING PLANTS

TECHNICAL FIELD

The present disclosure relates to electric apparatus that is configured to attenuate plant growth by the application of electrical energy thereto.

BACKGROUND

In properties both commercial and domestic, it is common to kill or at least control the growth of unwanted plants, commonly referred to as weeds. Conventional methods include treatment with a pesticide or more particularly a herbicide. However, there is a growing concern over such treatment for environmental reasons and unwanted exposure of herbicides to humans and animals. Moreover, weeds are increasingly becoming naturally resistant so herbicides are becoming more and more ineffective. As a result of these numerous drawbacks, the use of herbicides is increasingly prohibited.

Consequently, there is a desire for alternative treatments, which do not include the above drawbacks. An example includes treatment by the application of electrical energy. U.S. Pat. No. 4,338,743 discloses a respective apparatus, wherein electrical energy is applied at 14.4 kV at about 60 Hz to plants. Such apparatus has failed to become widespread in the market over concern over safety. For example, the high voltage may be a risk to a person in proximity to a treated weed.

Moreover, such apparatus has been found to interfere with other electrical equipment proximal the apparatus, which has led to the apparatus not being certified for use in certain areas, e.g. on railway lines, proximal which there is sensitive electronic equipment that is used for signalling and communication on a railway system.

Therefore, in spite of the effort already invested in the development of said apparatus further improvements are desirable.

SUMMARY

The present disclosure provides electrical apparatus to kill a plant or at least attenuate plant growth. The apparatus includes an electrical energy supply unit; an applicator unit comprising one or more applicator electrodes, and; a return unit comprising one or more return electrodes. The electrical energy supply unit is arranged to apply electrical energy through a transmission circuit comprising the or each applicator electrode and the or each return electrode and a plant.

In embodiments, the electrical energy supply unit includes a plurality of transformers, each transformer having a low voltage side and a high voltage side. The high voltage side of the transformers implementing the transmission circuit.

In embodiments, the high voltage sides of the transformers are electrically connected to each other to implement the transmission circuit.

As used herein the term "electrically connected" in respect of the transformers may refer to a connection of the high voltage side and/or low voltage side of the transformers to provide an arrangement which may implement the transformers in parallel or series to each other. It may include the output of transformers connected to each other and/or the output of transformers connected at an input to another. It may include a connection over both the applicator electrode and the return electrode. It may not, for example, include a group of transformers sharing a common return (or return electrode).

By implementing multiple transformers which are connected at the high voltage side, compared to a single larger transformer, the impedance of the transmission circuit, i.e. the source impedance, may be better matched to the impedance between the applicator electrode and earth electrode, i.e. the load (or plant) impedance. The improved impedance matching may enable a higher power to be delivered to the plant.

In embodiments, the electrical energy has a repeating waveform with a frequency of at least 500 Hz or 1 kHz. A maximum frequency may be less than 1 MHz or 0.5 MHz. When implementing the electrical energy with a repeating waveform that has high frequency, e.g. a frequency of substantially above 50 Hz, in combination with the multiple transformer arrangement, the small transformer requirements of high frequency is advantageously combined with multiple small transformers.

The lower turns ratio provided in each of the multiple transformers, compared to a larger turns ratio of a larger single transformer system (for the equivalent power transmission) introduces less parasitic losses. The reduced parasitic losses can advantageously obviate the need, or reduce a degree of high frequency filtering present in the electrical energy supplied to the transformer. High frequency noise may be introduced in the electrical energy by a waveform shaping system, which is arranged to implement a particular frequency and waveform shape in the electrical energy to the transformer. A substantial amount of high frequency noise is introduced as harmonics when implementing a square wave form. However since the multiple transformer system according to the disclosure can better handle high frequency noise, a more square waveform may be applied to the multiple transformers, which is better for power transmission due to the faster rise and fall.

However, a more sinusoidal waveform must be applied to a single larger transformer since it cannot handle the harmonics.

In embodiments, the low voltage sides of the transformers are electrically connected (including in addition or instead of the high voltage sides) to each other.

By implementing multiple transformers which are connected at the low voltage side, a more economical electrical energy supply unit may be provided, for example, a single waveform shaping system may provide a waveform to the connected low voltage side of the transformers.

In embodiments, the transformers have a turns ratio of 1:1 to 1:100 or 1:1 to 1:30 or 1:1 to 1:17. By implementing a turns ratio within these ranges it has been found that the above advantages are particularly apparent.

A turns ratio of less than 1:6 or 1:5 or 1:4 or 1:3 may be selected for use with a waveform which is square. A turns ratio of greater than 1:4 or 1:3 or 1:2 may be selected for use with a waveform which is sinusoidal, with an optional maximum of 1:17 or 1:20. Said range may be suitably matched to the transformers parasitic losses.

In embodiments, one or more of the transformers has variable tapping to achieve said turns ratio, e.g. it is tapped to provide ratios within any of the aforedescribed ranges. A variable turns ratio may be implemented to change the turns of the transformer, which may be particularly useful to change the impedance and/or losses as transformers are added or removed from the multiple transformer system. The tapping on the transformers may be arranged to step up the voltage to a first value and second value. The first value may be 2-3 kV. The second value may be 3 kV to 5 kV. The tapping may be implemented on a high voltage or low voltage side of the transformer.

In embodiments, the high voltage side of the transformer is connected in series or parallel or a combination thereof. By connecting the high voltage side of the transformer in series, low parasitic loss may be obtained. In embodiments, the low voltage side of the transformer is connected in parallel.

In embodiments, the low voltage side of one or more of the transformers is connected to a waveform shaping system of the electrical energy supply unit. The waveform shaping system may be specifically configured to apply a waveform in the electrical energy to the transformer, which may be selected for the particular turns ratio of the transformers.

In embodiments, a plurality of waveform shaping systems each connected to said one or more transformers (e.g. there may be one waveform shaping system for each transformer or a plurality of transformers can be connected to a waveform shaping system). By having a waveform shaping system driving several transformers, the apparatus may be more cost effective or convenient to control.

In embodiments, electrical circuitry controls the waveform shaping system to implement the waveform in the electrical energy to the transformer. In embodiments, the electrical circuitry controls the waveform shaping systems to generate waveforms that are in phase or out of phase.

In embodiments, the electrical circuitry is arranged to control the waveform shaping system to generate a waveform which is sinusoidal or square or a combination thereof. By implementing square, sinusoidal and combinational square and sinusoidal waveforms, the apparatus can supply a more square waveform for a lower turns ratio of transformer and a more sinusoidal waveform fora higher turns ratio transformer.

In embodiments, the electrical circuitry to control the waveform shaping system implements a dedicated processor for each waveform shaping system, and the processors are controlled by a master processor. By implementing a master processor, the individual waveform shaping systems can be controlled centrally. In embodiments, the master processor is one of the dedicated processors. In embodiments, a single processor controls multiple waveform shaping systems.

In embodiments, the apparatus comprises a filter system arranged to filter the electrical energy from the waveform shaping system to the transformer, the filter arranged to not pass (e.g. a low pass filter or a band stop filter) frequencies in the electrical energy above (including some, e.g. bands, or all) a frequency of the waveform. The filter system may reduce high frequency noise from being emitted by the transformer, which may be desirable in areas which are sensitive to electromagnetic radiation, e.g. when treating plants close to electrical equipment.

The present disclosure provides use of the apparatus as disclosed herein for treatment of a plant, e.g. to kill or weaken the plant. The use may implement any feature of the preceding embodiments or another embodiment disclosed herein.

The present disclosure provides a board for electrical apparatus to kill a plant or at least attenuate plant growth, the board comprising: a waveform shaping system; a transformer arranged to receive electrical energy from the waveform shaping system, wherein a high voltage side of the transformer is arranged to electrically connect to a high voltage side of a transformer of a corresponding separate board.

The present disclosure provides a system comprising a plurality of the apparatus of any preceding embodiment or another embodiment disclosed herein. The apparatus may comprise an electrical energy supply unit with a dedicated power supply unit to supply electrical energy thereto, or a power supply unit that supplies electrical energy to a plurality of electrical energy supply units of the apparatuses. The system may therefore comprise multiple pairs of applicator and earth electrodes each with a separate transmission circuit. Each transmission circuit may receive electrical energy from an electrical energy unit comprising multiple connected transformers (or in other embodiments an electrical energy unit comprising a single transformer).

In embodiments, the system is arranged to supply electrical energy to the transmission circuits in phase with each other. By supplying the electrical energy in phase, shorts between transmission circuits may be minimised.

In embodiments, the apparatus supply electrical energy to the transmission circuit in out of phase with each other. By supplying the electrical energy in out of phase, the demand on the power supply, e.g. the generator or other power implementation for the apparatuses, may be reduced.

The present disclosure provides a method of treating a plant with electrical energy. The method comprises supplying electrical energy from a plurality of electrically connected transformers through a transmission circuit comprising an applicator electrode, and the return electrode. The method may implement any feature of the preceding embodiments or another embodiment disclosed herein. In embodiments, the method comprises reducing a turns ratio of a transformer from a first amount to a second amount and changing a waveform from a first shape to a second shape, wherein the second shape more closely resembles a square wave than the first shape. The present disclosure provides electrical circuitry to implement the method.

The present disclosure provides a method of configuring an electrical energy supply unit of apparatus to kill a plant or at least attenuate plant growth, the method comprising: adding or removing blocks comprising transformers to an electrical energy supply unit, and connecting a high voltage side of the transformers to a transmission circuit comprising an applicator electrode, and a return electrode, to change an electrical impedance of the electrical energy supply unit.

The present disclosure provides a system to electrically kill a plant or at least attenuate plant growth, the system comprising: a power supply; a plurality of modules, each module comprising: one or more pairs of applicator electrodes and return electrodes, which may be arranged as a component of an applicator unit and a return unit respectively; module electrical circuitry to control a waveform in electrical energy applied through a transmission circuit comprising the applicator electrode, and the return electrode of said pairs and in use a plant to be treated, and; master electrical circuitry to control the module electrical circuitry to apply the electrical energy for each module. In embodiments, the electrical energy for each module is applied in a synchronised manner relative to the other modules.

By implementing master control circuitry, e.g. which is implemented in a separate device which is distinct from the modules, an output of all separate modules can be controlled to operate relative to each other, which may ensure that the system is safer, e.g. with reduce electrical arcing between the electrodes of the modules, or with reduced demand on the power supply, e.g. by staggering the phases of the outputs so that not all modules are drawing electrical current at the same time.

In embodiments, each module comprises a waveform shaping system which is controlled by the module electrical circuitry to control said waveform. By implementing a waveform shaping system, at each module a wide range of control of the output electrical energy may be possible.

In embodiments, each module comprises an electrical energy transformer arrange to increase the voltage of the electrical energy applied to the transmission circuit compared to the voltage of the electrical energy supplied from the power supply. By implementing an electrical transformer in each module arranged to step-up the voltage, a system of low cost/more transportable smaller transformers may be implemented, as opposed to a single larger transformer which is shared between the modules. Moreover, the impedance may be better matched to the impedance between the applicator electrode and earth electrode, i.e. the load (or plant) impedance. The improved impedance matching may enable a higher power to be delivered to the plant.

Such an arrangement may also combine with the provision of high frequency electrical energy, since high frequency electrical energy permits the use of smaller transformers. With such an arrangement, the transformers may be arranged to receive the output of the wave shaping system.

As used herein the term "synchronised manner" may refer to the synchronising of the outputs of the modules to be controlled relative to each other in some manner as opposed to arbitrary output that is independent of each other. It may include the output of the modules each being controlled in some way by a control signal from the master electrical circuitry.

In embodiments, the synchronised manner includes: control of a first group of one or more of the modules to output electrical energy in phase from the electrical energy output of a second group of one or more of the modules other (e.g. such that the outputs all rise and fall at the same time and optionally have the same amplitude). With such an arrangement there may be reduced risk of electrical arcing between the electrodes of different modules.

In embodiments, the synchronised manner includes: control of a first group of one or more of the modules to output electrical energy in anti-phase from the electrical energy output of a second group of one or more of the modules (e.g. an antiphase relationship such that as the first group peaks the second group troughs). With such an arrangement there may be reduced power demands compared to the inphase example.

In embodiments, the synchronised manner includes: control of groups of one or more of the modules to stagger the output of the electrical energy from other group of one or more of the modules (e.g. so that each output rises within a predetermined time of another). There may for example be any number of groups each with one or more modules, for which the output is the same within a group, but is staggered between the groups. With such an arrangement there may be reduced power demands compared to the inphase and/or antiphase example.

In embodiments, the master electrical circuitry or other electrical circuitry is configured to prevent output of electrical energy of a group of one or more modules based on a determined condition of the system. Such an arrangement, in combination with the aforedescribed synchronisation, may enable the system to be conveniently operated over a range of operating conditions.

In embodiments, said determined condition of the system includes one or more of: an electrical arc is detected at the applicator or return electrodes of the module; an output power or current of the power supply unit or a power or current of a module has crossed a threshold; an electrical continuity between one or both electrodes of module have crossed a threshold; the return unit or applicator unit of a module is determined as having crossed a temperature threshold; a plant for treatment not being determined as present.

In embodiments, the master electrical circuitry includes a master processor and the module electrical circuitry include a slave processor and the master processor provides a control signal to the slave processor. By implement a control signal between master and slave processors the modules may be maintained to operate synchronously. In embodiments, the control signal includes a clock signal for synchronisation. In embodiments, the waveform shaping system controls the waveform by pulse width modulation and the control signal includes information for control of said modulation. As used herein the "information for control of said modulation" may include a signal of a particular frequency that is used to synchronise part of the waveforms, e.g. the rising edge.

In embodiments, the master processor is implemented as one of the processors of the modules. By implementing the master processor as one of the processors of the modules, it may be avoided having a dedicated master control unit, and the identification of the master may be moved within the modules as the system is changed.

In embodiments, the modules are each arranged on a board, and the boards are supported by a common chassis. By arranging the modules on the same configuration boards, they may be conveniently added or removed from the chassis to adapt the capability of the system, e.g. when more or less outputs are required.

In embodiments, the common chassis includes an electrical connection to the power supply, and the boards are removably attached to the common chassis. By implementing an electrical connection on the chassis, the models may be conveniently connected to the power supply, e.g. as part of connecting the module to the chassis.

In embodiments, the power supply is arranged as a single unit that supplies the modules or as multiple units, each of which supplying one or more of the modules.

In embodiments, the master electrical circuitry or other electrical circuitry is arranged to store position information on a positional arrangement of the applicator and/or return electrodes of the modules.

By storing known positions of the electrodes a complex system of numerous electrodes can be mapped and controlled appropriately. For example, if only treatment of plants in a particular region (e.g. a left, right or centre) is required then this region may be determined based on the position information and the modules of said region controlled to provided electrical energy, with those outside said region to be inoperable.

In embodiments, the electrical circuitry is configured to assign groups (e.g. for the same control throughout the group) to the modules based on said positional arrangement. By automatically assigning groups for the same control, the system may be more convenient to operate.

In embodiments, the electrical circuitry is configured to provide a notification to a user via a user interface if a position of an electrode is determined as less that a threshold of another. For example, in an active system with a position determination system, if a position of an electrode changes, then a user may be conveniently notified in case of a dangerous operating condition.

In embodiments, the master electrical circuitry includes a user interface, and the user interface is configured to provide the position information via a user input and/or a user selection of modules for a group based on a user input.

In embodiments, the system includes a position determination system which is confined to determine position information comprising a of the electrodes. In embodiments, the position determination system includes position sensors associated with the electrodes (e.g. arranged on or in operative proximity to the electrodes such that meaningful position information is provided), and the position determination system is configured to provide the position information based on information from the position sensors. An arrangement of sensors can provide active information in real time on the position of the electrodes.

In embodiments, the position information is provided to a user via a user interface, and the user is able via the user interface to assign groups to the modules based on said positional arrangement.

In embodiments, the modules are arranged into groups based on a location (e.g. 3 dimensional coordinates) of the electrodes, and each group is independently controllable (e.g. a group can be operational to supply electrical energy when the others groups are not).

In an embodiment, a group may cover a predefined lateral position (e.g. left, centre or right) of a farming implement that extends in a lateral direction that is perpendicular to a longitudinal direction of motion of said farming implement in use. By implementing the modules to cover predefined groups, particular areas of plants may be targeted and not others.

In embodiments, system includes a user interface to receive a user input to operate a group of modules and the master electrical circuitry is arranged to receive said input and operate the associated group to apply the electrical energy. By allowing the user to select which groups are operated via a user interface, part areas of plants for treatment may be conveniently toggled between.

The present disclosure provides a method of controlling electrical energy of a system to electrically kill a plant or at least attenuate plant growth, the method comprising: controlling via master electrical circuitry and module electrical circuitry, an electrical energy output of a plurality of separate modules to output said electrical energy in a synchronised manner, wherein said modules comprise the module electrical circuitry to control a waveform of the electrical energy and an applicator electrode and a return electrode. The method may implement the features of any preceding embodiment or another embodiment disclosed herein.

The present disclosure provides electrical circuitry or a computer readable medium to implement the method of any preceding embodiment or another embodiment disclosed herein.

The preceding summary is provided for purposes of summarizing some embodiments to provide a basic understanding of aspects of the subject matter described herein. Accordingly, the above-described features are merely examples and should not be construed to narrow the scope or spirit of the subject matter described herein in any way. Moreover, the above and/or proceeding embodiments may be combined in any suitable combination to provide further embodiments. Other features, aspects, and advantages of the subject matter described herein will become apparent from the following Detailed Description, Figures, and Claims.

BRIEF DESCRIPTION OF THE FIGURES

Aspects, features and advantages of embodiments of the present disclosure will become apparent from the following description of embodiments in reference to the appended drawings in which like numerals denote like elements.

DETAILED DESCRIPTION OF EMBODIMENTS

Figure 1:
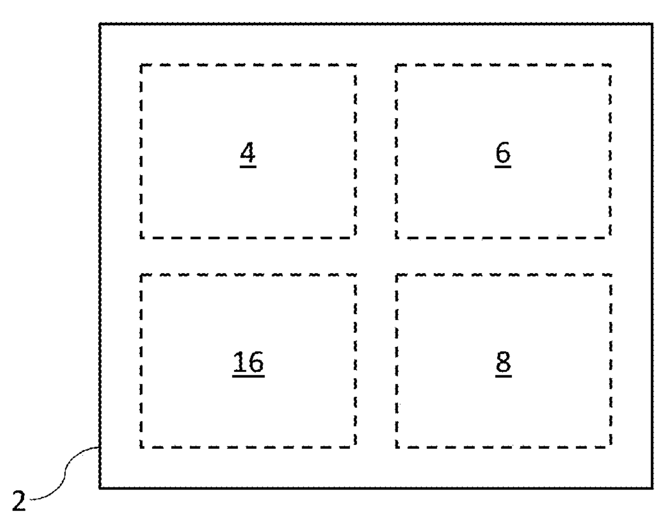
FIG. 1 is a block system diagram showing embodiment electrical apparatus to attenuate plant growth.

Before describing several embodiments of the apparatus, it is to be understood that the system is not limited to the details of construction or process steps set forth in the following description. It will be apparent to those skilled in the art having the benefit of the present disclosure that the system is capable of other embodiments and of being practiced or being carried out in various ways.

The present disclosure may be better understood in view of the following explanations:

As used herein, the term "plant" or "weed" may refer to an undesired plant in a human controlled setting, such as a farm field, garden, lawn or park. A weed may refer to a multicellular photosynthetic eukaryote.

As used herein, the term "electrical arc" or "arc" may refer to an electrical breakdown of a gas that produces an electrical discharge. An arc is formed by an electrical current through a normally nonconductive medium such as air, and is characterized by a plasma, which may produce visible light. An arc discharge is characterized by a lower voltage than a glow discharge and relies on thermionic emission of electrons from the electrodes supporting the arc.

As used herein, the term "electrical energy" or "processed electrical energy" may refer to electrical energy supplied by an electrical energy supply unit and applied to the plant, e.g. through a transmission circuit. The electrical energy may comprise a periodic or aperiodic waveform, i.e. a waveform that continuously repeats with the repeating units therein having a constant or a varying period, e.g. a pulsed wave with a fixed duty cycle or a varying duty cycle. The shape of the repeating unit may be one of or a combination of one or more of the following forms: sine wave; saw-tooth wave; triangular wave; square wave; pulsed, e.g. DC pulsatile, half-wave rectified; other known form. The exact shape of the repeating unit may be an approximation of one of the aforesaid forms for reasons of distortion, e.g. overshoot/undershoot and the associated ringing and settle time. The repeating unit may be positive or negative or a combination thereof with respect to a selected reference value, which is typically earth or the 0 V of the voltage supply but may be another positive or negative voltage level. The frequency of the waveform may be above 25 Hz, 1 kHz, 10 kHz, 18 kHz or 25 kHz. The peak voltage may be of at least 1 kV, and may have a maximum of 70 kV. The electrical current may be of at least 10 mA rms, and may have a maximum of 250 A. With such a current and voltage applied though a transmission circuit that includes the plant, the water present plant may in effect be vaporized by the electrical energy, which can cause substantial cellular damage to the plant. This damage may in particular be exacerbated at high frequency in, inter alia, the Xylem and phloem. It will be understood that when referring to the voltage of the electrical energy, when the electrical energy has a waveform, the voltage is in respect of a suitable quantity, such as RMS, peak or other. The same applies for other electrical quantities such as power and current.

As used herein, the term "electrical energy supply unit" may refer to any unit or system, including a distributed system, for generating and/or conditioning electrical energy for supply to a transmission circuit which, in use, incorporates a plant.

As used herein, the term "electrical circuitry" or "electric circuitry" or "electronic circuitry" or "circuitry" or "control circuitry" may refer to, be part of, or include one or more of the following or other suitable hardware or software components: an Application Specific Integrated Circuit (ASIC); electronic/electrical circuit (e.g. passive electrical components, which may include combinations of transistors, transformers, resistors, capacitors); a processor (shared, dedicated, or group); a memory (shared, dedicated, or group), that may execute one or more software or firmware programs; a combinational logic circuit. The electrical circuitry may be centralised on the apparatus or distributed, including distributed on board the apparatus and/or on one or more components in communication with the apparatus, e.g. as part of the system. The component may include one or more of a: networked-based computer (e.g. a remote server); cloud-based computer; peripheral device (e.g. a table, mobile device etc). The circuitry may be implemented in, or functions associated with the circuitry may be implemented by, one or more software or firmware modules. The circuitry may include logic, at least partially operable in hardware.

As used herein, the term "processor" or "processing resource" may refer to one or more units for processing including an ASIC, microcontroller, FPGA, microprocessor, digital signal processor (DSP) capability, state machine or other suitable component. A processor may include a computer program, as machine readable instructions stored on a memory and/or programmable logic. The processor may have various arrangements corresponding to those discussed for the circuitry, e.g. on-board and/or off board the apparatus as part of the system.

As used herein, the term "applicator unit" or "applicator" may refer to any suitable device for applying electrical energy to a plant, including by direct contact with the plant and/or spark transmission. In particular, an applicator electrode of the applicator unit may be arranged for direct contact with a portion of the plant above the ground.

As used herein, the term "earth unit" or "return unit" may refer to any suitable device for receiving electrical energy from a circuit including the plant and optionally the ground to complete a transmission circuit, including by direct contact with the plant and/or spark transmission. A return electrode of the return unit may be inserted into the ground, or arranged to rest on/be dragged along the surface of the ground, or otherwise electrically connected to the ground to receive the electrical energy transmitted through the above ground portion of the plant, and the ground surrounding the plan as part of the transmission circuit.

As used herein, the term "apparatus" or "electrical apparatus" may refer to any combination of one or more of the following for treatment of a plant: electrical energy supply unit; electrical circuitry; applicator unit; applicator electrode; return unit; return electrode; transmission circuit.

As used herein, the term "board" may refer to a carrier member suitable for mechanically supporting and connecting electrical and/or electronic componentry. It can include a printed circuit board, which may have conductive tracks, pads and other features etched from one or more sheet layers of copper laminated onto and/or between sheet layers of a non-conductive substrate.

As used herein, the term "filtering system" may refer to a device or plurality of devices arranged to remove or at least partially suppress unwanted components, e.g. harmonics, from the electrical energy, including said components introduced by a power supply unit and/or waveform shaping system. The filtering system may act in the frequency domain to remove frequencies or frequency bands, and may comprise one or more of the following configurations: high-pass; low-pass; band-pass; band-stop; notch; comb; roll off; or other configuration. The filtering system can be implemented by one or more of: resistors; capacitors; inductors; other components.

As used therein the term "waveform shaping system" may refer to an arrangement capable of generating a particular waveform shape in the electrical energy, including one or more of a sinewave; square wave; sawtooth. The waveform shaping system includes an electrically operated switch capable of operating at high frequency, e.g. a MOSFET. The waveform shaping system includes electrical circuitry for control of the electrically operated switch to form particular waveforms. The waveforms may be formed by pulse width modulation (PWM). In an example a sine wave is formed by varying the duty or pulse width.

As used herein the term "module" may refer to a separate output unit which receives its own energy input and provides its own electrical energy output to a dedicated transmission circuit comprising an applicator electrode, a return electrode and the plant. The module may be arranged on one or more dedicated boards that are separate from other modules. The electrical energy output from the module may be independently controllable from the output of other modules.

As used herein the term "group" may refer an assigned number of one or more modules, all of which are controlled together, e.g. to have the same output electrical energy. A groups may optionally be controlled in a synchronised manner.

As used herein the term "module electrical circuitry" may refer to electrical circuitry as defined herein, which is part of the module, e.g. it is located on the module. The electrical circuitry can include an input unit to receive a control signal from master electrical circuitry, a processor to process the control signal and an output unit to control the waveform shaping system.

Figure 2:
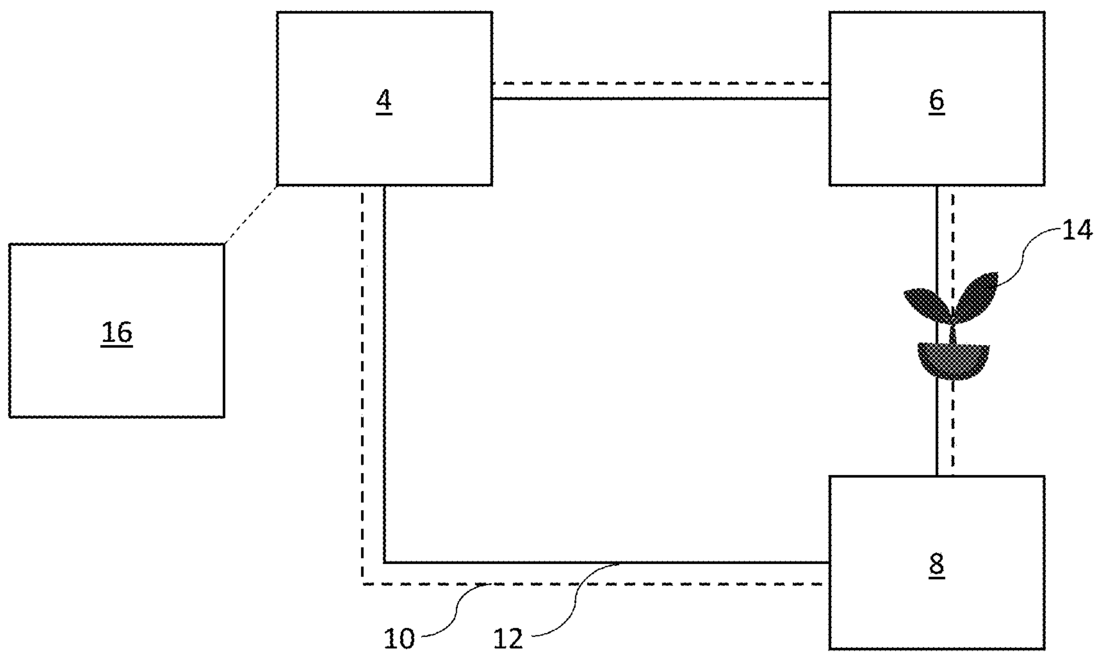
FIG. 2 is a schematic diagram showing the apparatus of FIG. 1.

Referring to FIGS. 1 and 2, apparatus 2 to attenuate plant growth, comprises an electrical energy supply unit 4, an applicator unit 6 and a return unit 8. The electrical energy supply unit supplies electrical energy 10 around a transmission circuit 12, which includes the applicator unit 6, return unit 8.

The transmission circuit 12, when treating a plant, may include said plant 14. It will be understood that depending on the operative arrangement of the applicator unit and return unit, a return path of the transmission circuit 12 optionally includes other matter, such as proximal earth and fluid (e.g. air and moisture) to the plant.

The apparatus 2 includes electrical circuitry 16, which may implement a range of control operations. In embodiments, said circuitry 16 is operable to control the electrical energy supplied by the electrical energy supply unit 4 through the transmission circuit 12, as will be discussed.

Figure 3:
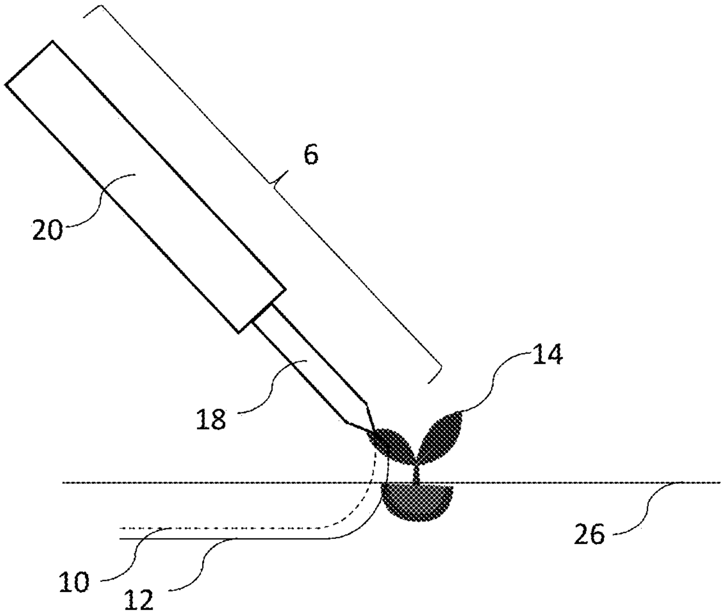
FIG. 3 is a schematic diagram showing an applicator unit of the apparatus of FIG. 1.

Referring to FIG. 3, the applicator unit 6 is adapted to receive electrical energy 10 from the electrical energy supply unit 4 and to transmit said electrical energy 10 to the plant 14 (shown in FIG. 2). The applicator unit 6 comprises an applicator electrode 18. The applicator electrode 18 is electrically connected to the electrical energy supply unit 4 by an electrically conductive material, e.g. by wiring or solid material, which forms part of the transmission circuit 12.

The applicator electrode 18 is adapted to apply the electrical energy 10 to the plant 14. In embodiments, the applicator electrode 18 is arranged for direct contact with the plant 14. As used herein "direct contact" may refer to physical contact between the plant and electrode, and may be achieved by operatively arranging the electrode to be exposed from a body of the applicator. The applicator electrode 18 comprises an electrically conductive material e.g. copper, zinc, bronze, brass, aluminium or steel.

The geometric configuration of the applicator electrode 18 may be selected depending on the intended treatment regimen, for example: a rod for sweeping through areas of dense plants; a hook-shape for separating plants.

The applicator unit 6 comprises body 20 to carry the applicator electrode 18. The body 20 may be adapted to be held by a user or fixed to a chassis depending on the particular configuration of the apparatus 2 (e.g. adapted for domestic or agricultural implementation respectively).

In embodiments, which are not illustrated, the applicator electrode is implemented as a plurality of electrodes, e.g. for treatment of multiple plants at a given moment.

Figure 4:
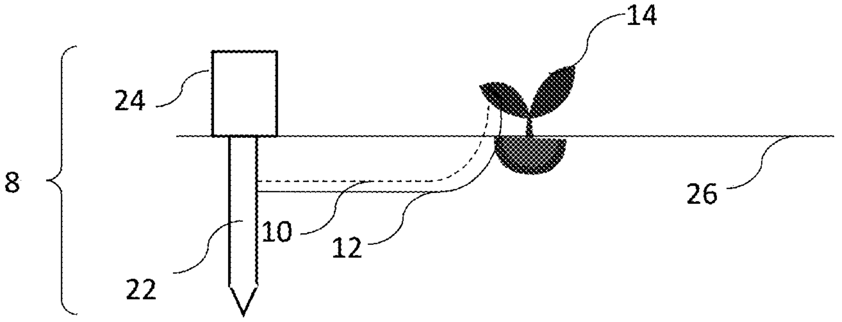
FIG. 4 is a schematic diagram showing a return unit of the apparatus of FIG. 1.

Referring to FIG. 4, the return unit 8 is adapted to receive electrical energy 10 from the applicator unit 6 via the plant 14 (shown in FIG. 2). The return electrode 22 is electrically connected to the electrical energy supply unit 4 by an electrically conductive material, e.g. by wiring or solid material, which forms part of the transmission circuit 12.

The return electrode 22 is adapted to provide a return for electrical energy 10 via the plant 14 to complete the transmission circuit 12. In embodiments, the return electrode 22 is arranged for direct contact with the ground 26 (shown in FIG. 4). As used herein "direct contact" may refer to physical contact between the ground and electrode, and may be achieved by operatively arranging the electrode to be exposed from a body of the return unit. The return electrode 18 comprises an electrically conductive material e.g. copper, zinc, bronze, brass, aluminium or steel.

The geometric configuration of the return electrode may be selected depending on the intended implementation of the apparatus, for example: an implement for insertion into the ground (e.g. for apparatus that in use remains in a generally fixed position), such as a rod or spike; an implement for movement along the ground (e.g. for apparatus that in use has a variable position), such as a rod or spike), such as a flat plate or roller, and; a combination of the aforesaid implementations.

The return unit 8 comprises body 24 to carry the return electrode 22. The body 24 may be adapted to be held by a user or fixed to a chassis depending on the particular configuration of the apparatus 2 (e.g. adapted for domestic or agricultural implementation respectively).

In embodiments, which are not illustrated, the return electrode is implemented as a plurality of electrodes, e.g. for treatment of multiple plants at a given moment.

Generally, the apparatus 2 is arranged with the return electrode 22 arranged in operative proximity to the applicator electrode 18. Operative proximity may refer to a geometric arrangement to limit the path of the electrical energy 10 through the ground 26, which may advantageous for reasons of efficient and/or electrical safety.

Figure 5:
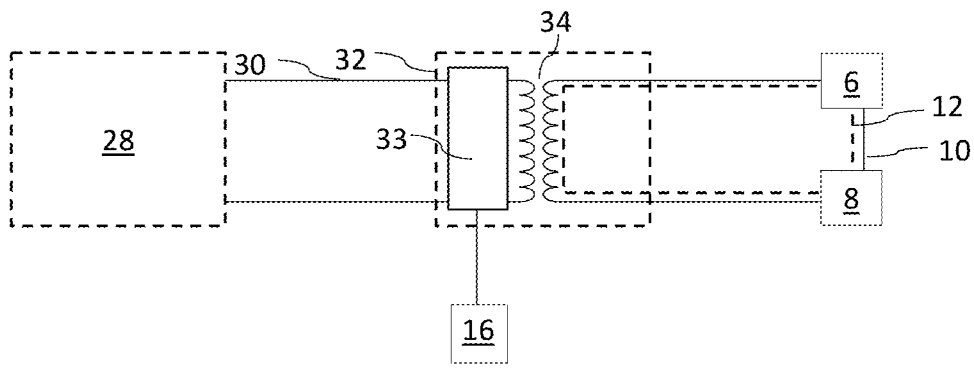
FIG. 5 is a schematic diagram showing an electrical energy supply unit, transmission circuit and electrical circuitry of the apparatus of FIG. 1.

Referring to FIG. 5, the electrical energy supply unit 4 is arranged to supply processed electrical energy 10 to the transmission circuit 12. The electrical energy supply unit 4 includes a power supply 28 for supply of supply electrical energy 30. The power supply 28 may be implemented as one or more of the following: a battery; a fuel cell; a generator, including an internal combustion engine powered generator, which may be implemented with a dedicated internal combustion engine or a shared internal combustion engine for other agricultural equipment, e.g. a tractor, which is arranged to drive the generator; other like. The power supply 28 provides supply electrical energy 30, in alternating current (AC) or direct current (DC), including pulsated or with other form with a fixed quantity, e.g. in one or more or power; voltage; current; frequency; phase.

The electrical energy supply unit 4 includes an electrical energy processing unit 32 for processing of the supply electrical energy 30 to the electrical energy 10. The electrical energy processing unit 32 includes one or more electrical transformers 34 with appropriately configured windings, e.g. for step-up or step down, depending on the configuration of the supply electrical energy 30 and desired output of the electrical energy 10.

In variant embodiments, which are not illustrated, alternative step-up or step-down converters to the transformer are implemented, e.g. a boost converter, other amplifier topology. A step-up or step-down converter may also be obviated if the electrical energy is supplied in the desired form. For example, the transformer may be obviated if the electrical energy is supplied in the desired form by: the power supply; or the power supply is replaced by an input unit to receive a commercial or domestic electrical supply (a mains supply).

Where the power supply 28 provides supply electrical energy 30 as AC (e.g. the power supply 28 is arranged as a generator) or the power supply 28 is omitted and there is an input unit comprising a circuit for receiving an electrical supply (e.g. from a mains electrical supply or other electrical supply) the electrical energy processing unit 32 includes a AC to DC converter (not illustrated) arranged to provide a DC current to a waveform shaping system, which may be referred to as a switching system 33. Where the power supply 28 provides supply electrical energy 30 as DC, e.g. a battery, an AC to DC converter is obviously obviated.

The electrical energy processing unit 32 includes a switching system 33 to generate the desired wave form (e.g. in shape and/or frequency) in the electrical energy supplied to the electrical transformer 34. The switching system 33 is implemented as an electrically operated switch (e.g. a MOSFET, other transistor).

In variant embodiments of the electrical energy supply unit, which are not illustrated, the power supply (or electrical supply to the input unit) supplies electrical energy of the desired configuration. Accordingly, the electrical energy processing unit is obviated. In other embodiments, the power supply (or input unit) supplies electrical energy which only needs step-up or step-down, in which case the switching system is obviated but the transformer is maintained. In other examples the switching system is present but the step-up or step-down converter is omitted.

The electrical circuitry 16 is implemented to control the electrical energy 10, through the transmission circuit 12. Said control may implement control of one or more of the following electrical quantities: electrical potential between the applicator and return electrodes; electrical current control; frequency or duty control; phase.

In the embodiment of FIG. 5, the electrical circuitry 16 controls the switching system 33 to implement control of the voltage and current by pulse width modulation. The frequency is controlled by the rate of switching. In variant embodiments, which are not illustrated, the electrical quantities can be controlled by other means, e.g. including by changing the tapping of the electrical transformer (on the primary and/or secondary coil), which may be implemented as a variable transformer, by introducing capacitance and/or inductance in the transmission circuit.

Figure 6:
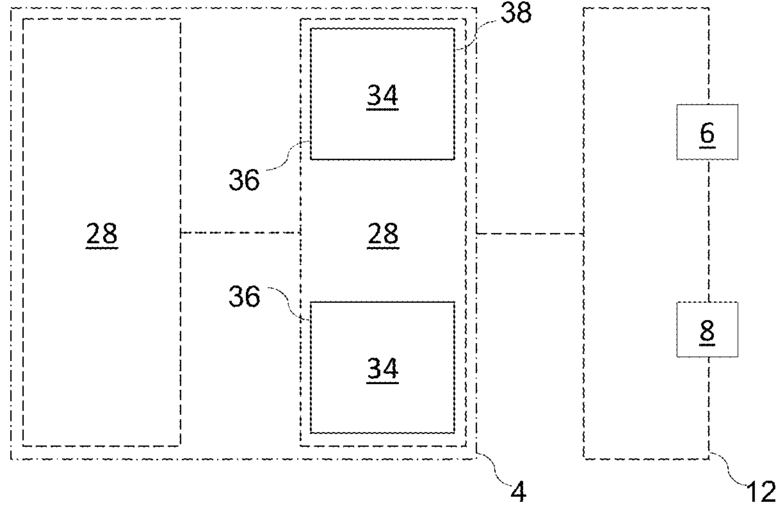
FIG. 6 is a schematic diagram showing an electrical energy supply unit and a transmission circuit of the apparatus of FIG. 1.

Referring to FIG. 6, the electrical energy supply unit 4 includes a plurality of transformers 34 (only 2 are illustrated). Each transformer 34 has a low voltage side 36 and a high voltage side 38, the high voltage sides 38 of the transformers 34 implement the transmission circuit 12.

Various numbers of transformers can be implemented, with the high voltage side and/or low voltage side connected in series or parallel as will be exemplified in the following examples.

Figure 7:
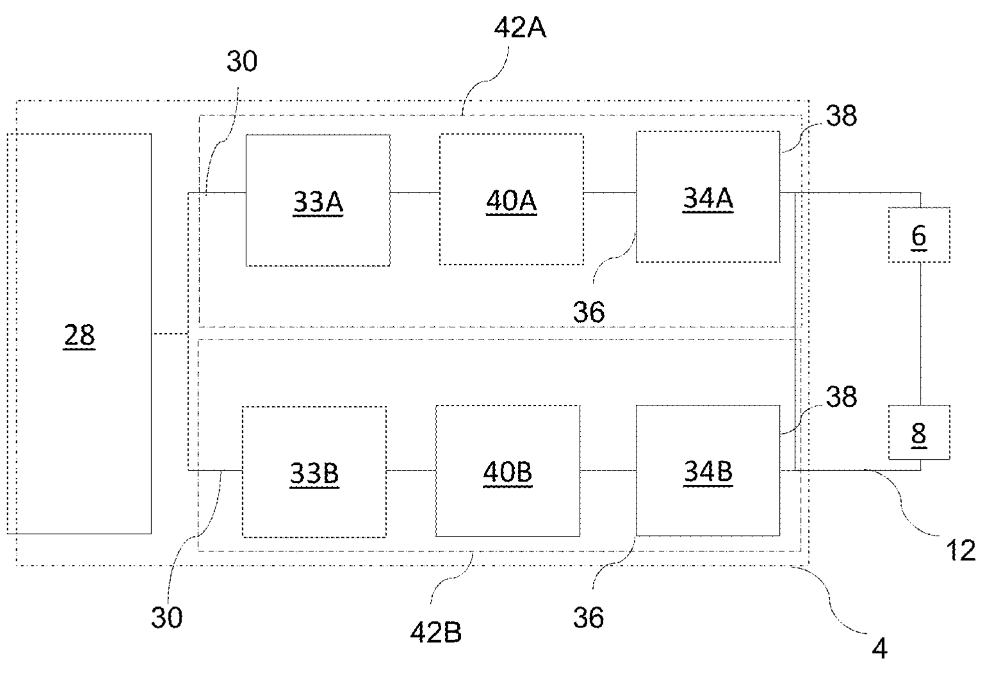
FIG. 7 is a schematic diagram showing an implementation of the electrical energy supply unit and transmission circuit of the apparatus of FIG. 6.

Referring to FIG. 7, in a first example, the electrical energy supply unit 4 includes a first block 42A and a second block 42B. The blocks 42A, 42B comprise respective transformers 34A, 34B. The transformers 34A, 34B each have a low voltage side 36 and a high voltage side 38. The low voltage side 36 is arranged to receive supply electrical energy 30 from the power supply unit 28. The high voltage side 38 is arranged to transmit the electrical energy 10 around the transmission circuit 12.

The high voltage sides 38 of the transformers 34A, 34B are electrically connected in series to implement the transmission circuit 12. The low voltage sides 36 of the transformers 34A, 34B share the same connection to the power supply 28, and therefore are effectively connected in parallel.

A dedicated waveform shaping system 33A, 33B is connected to the low voltage side 36 of each transformer. In variant embodiments, which are not illustrated, where the power supply unit provides the desired waveform, the waveform shaping system is omitted.

A dedicated filtering system 40A, 40B is arranged to filter the supply electrical energy 30 to the low voltage side 36 of the each transformer. In particular, it is arranged to filter harmonics and/or other errors introduced in the waveform implemented by the waveform shaping system and/or in the supply electrical energy 30 form power supply unit 28. In variant embodiments, which are not illustrated, where the transformer can handle any such errors (e.g. it has a low number of windings) then the filtering system may be omitted.

In variant embodiments, which are not illustrated, the electrical energy supply unit includes other numbers of blocks (e.g. including 1, 3, 4 or more), that can be added or removed to/from the power supply unit (with the aforedescribed series connection of the high voltage side and parallel connection of the low voltage side) to provide the desired impedance of the electrical energy supply unit.

In variant embodiments, which are not illustrated, the blocks 42A and 42B (in the case of two blocks, but in other embodiments one or more blocks), are implemented as a group. There may be multiple groups, (e.g. 2, 3, 4 or more) present, with each group having or sharing a dedicated connection to the power supply. Each group may be electrically connected at the high voltage side so supply the same applicator electrode and earth electrode. Alternatively a group may supply a dedicated applicator electrode and earth electrode.

Figure 8:
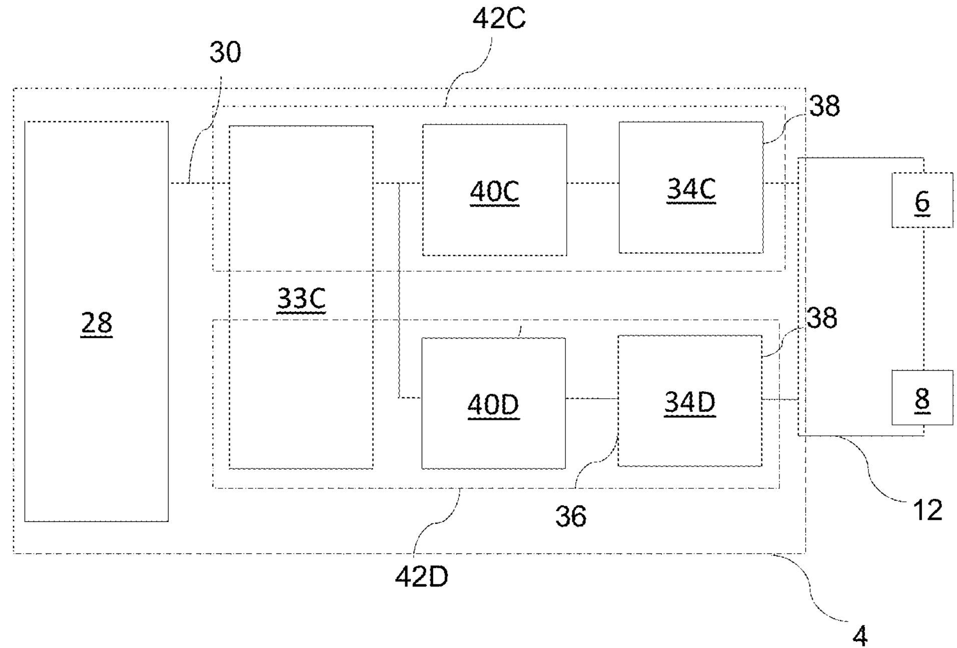
FIG. 8 is a schematic diagram showing an implementation of the electrical energy supply unit and transmission circuit of the apparatus of FIG. 6.

Referring to FIG. 8, in a second example, the electrical energy supply unit 4 includes a first block 42C and second block 42D. The blocks 42A, 42B comprise respective transformers 34C 34D. The transformers 34C, 34D each have a low voltage side 36 and a high voltage side 38. The low voltage side 36 is arranged to receive supply electrical energy 30 from the power supply unit 28. The high voltage side 38 is arranged to transmit the electrical energy 10 around the transmission circuit 12.

The high voltage sides 38 of the transformers 34A, 34B are electrically connected in series to implement the transmission circuit 12. The low voltage sides 36 of the transformers 34A, 34B share the same connection to the power supply 28, and therefore are effectively connected in parallel.

Unlike the embodiment of FIG. 7, a dedicated waveform shaping system 33C is connected to the low voltage side 36 of the each transformer 34C, 34D. Hence the blocks share a common waveform shaping system 33C. In variant embodiments, which are not illustrated, where the power supply unit provides the desired waveform, the waveform shaping system is omitted.

A dedicated filtering system 40C, 40D is arranged to filter the supply electrical energy 30 to the low voltage side 36 of the each transformer. In particular, it is arranged to filter harmonics and/or other errors introduced in the waveform implemented by the waveform shaping system and/or in the supply electrical energy 30 form power supply unit 28.

In variant embodiments, which are not illustrated, where the transformer can handle any such errors (e.g. it has a low number of windings) then the filtering system may be omitted. In variant embodiments, which are not illustrated the blocks may share the same filtering system. Alternatively, a single filtering system is implemented before the parallel connection of the transformers.

In variant embodiments, which are not illustrated, the electrical energy supply unit includes other numbers of blocks (e.g. including 1, 3, 4 or more), that can be added or removed to/from the power supply unit (with the aforedescribed series connection of the high voltage side and parallel connection of the low voltage side) to provide the desired impedance of the electrical energy supply unit.

In variant embodiments, which are not illustrated, the blocks 42C and 42D (in the case of two blocks, but in other embodiments one or more blocks), are implemented as a group. There may be multiple groups, (e.g. 2, 3, 4 or more)

present, with each group having or sharing a dedicated connection to the power supply. Each group may be electrically connected at the high voltage side so supply the same applicator electrode and earth electrode. Alternatively a group may supply a dedicated applicator electrode and earth electrode.

In variant embodiments, which are not illustrated, the transformers in the above embodiments are alternatively connected, e.g. including with the high voltage side in parallel and/or the low voltage side in series.

In variant embodiments, which are not illustrated, the transformers can be tapped to achieve a variable turns ratio. In this way as blocks are added or removed (e.g. for the first or second example), the turns ratio can be changed to accommodate the change in transformer quantity.

Moreover, the tapping can be changed to achieve a different impedance for the electrical energy supply unit.

As an example, (i.e. the load being a plant), eight transformer blocks maybe arranged (e.g. with the high voltage sides connected in series as in example 1 or 2 above). For high impedance load, e.g. 15-30 k Ohms, the tapping can be 1:12. For medium impedance load, e.g. 1-5 k Ohms, the tapping can be 1:7. For low impedance load, e.g. 500 Ohms-2 k Ohms, the tapping can be below 1:4.

The electrical circuitry 16 (shown in FIG. 5), implements a processor (not illustrated) to control the waveform shaping systems 33. A processor may be implemented for each waveform shaping system, each of which can be controlled by a master processor, which can be a separate processor or one of the processors of a waveform shaping system. Alternatively, a single processor controls all of the waveform shaping systems.

The electrical circuitry 16 can control the phase difference between the waveforms generated by the waveform shaping systems.

In the first example, shown in FIG. 7 the electrical circuitry 16 can control the waveform shaping systems 33A and 33B to produce waveforms that are inphase with each other.

Where the first example is extended to comprise multiple groups (not illustrated), each comprising blocks 42A and 42B (or in other embodiments other numbers of blocks), the electrical circuitry 16 can control the waveform shaping systems 33A and 33B of the groups to produce waveforms that are inphase or antiphase with each other.

Where the groups each connect to a single set of applicator electrodes and earth electrodes the electrical circuitry 16 can control the waveform shaping systems 33A and 33B to produce waveforms that are inphase with each other.

Where the groups each connect to a dedicated set of applicator electrodes and earth electrodes for each group, electrical circuitry 16 can control the waveform shaping systems 33A and 33B to produce waveforms that are inphase or antiphase with each other. By having an inphase arrangement, the risk of shorting between electrodes of the groups may be minimized. By having an antiphase arrangement, the demands on the power supply may be lessened.

In the second example, shown in FIG. 8, when extended to comprise multiple groups (not illustrated), the electrical circuitry 16 can control the waveform shaping systems 33A and 33B of the groups to be inphase or antiphase with each other.

Where the groups each connect to a single set of applicator electrodes and earth electrodes the waveform shaping systems 33C of each group can be controlled to produce waveforms that are inphase with each other.

Where the groups each connect to a dedicated set of applicator electrodes and earth electrodes for each group, the waveform shaping systems 33C can be controlled to produce waveforms that are inphase or antiphase with each other. By having an inphase arrangement, the risk of shorting between electrodes of the groups may be minimized. By having an antiphase arrangement, the demands on the power supply may be lessened.

The electrical circuitry 16 controls the wave form shaping systems 33 to generate a waveform which is sinusoidal or square or a combination thereof.

Figures 9, 10:
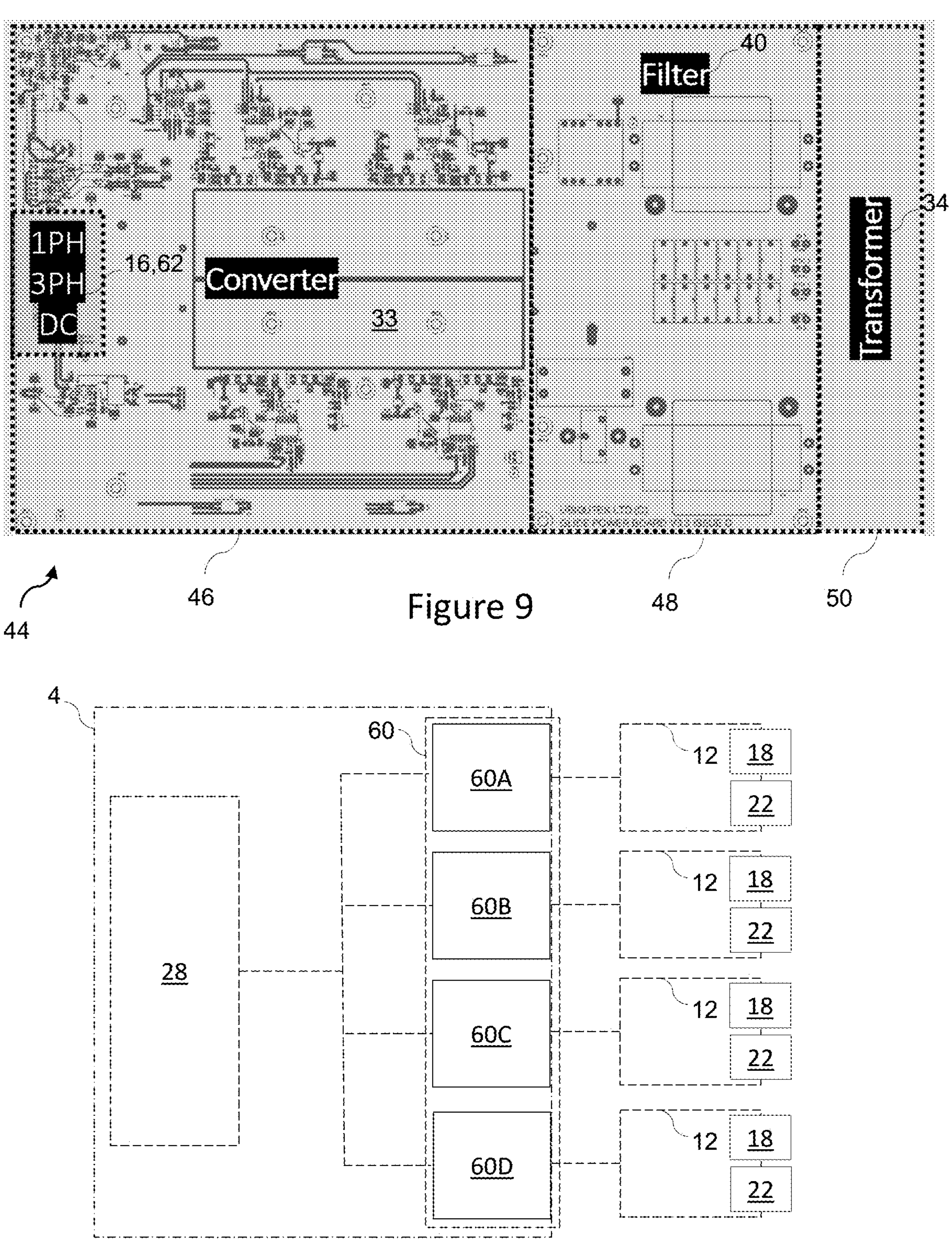
FIG. 9 is a board layout diagram showing an implementation of the electrical energy supply unit and transmission circuit of the apparatus of FIG. 7.
FIG. 10 is a schematic diagram showing an implementation of a system comprising supply unit and modules associated with the apparatus of FIG. 1.

Referring to FIG. 9, a board 44 comprises a block 42 of the first example. A first portion 46 of the board 44 comprises the waveform shaping system 33 and circuitry 16 to control the waveform shaping system 33. A second portion 48 of the board 44 comprises the filter 40. A third portion 50 of the board 44 comprises the transformer 34.

waveform shaping system 33 and circuitry 16 to control the waveform shaping system 33 are arranged distal, e.g. at opposed ends of the board 44, the transformer 34 to avoid and interference from the electromagnetic field/heating.

The high voltage side of the transformer 34 is arranged to electrically connect to a high voltage side of a transformer of a corresponding separate board (not illustrated). In particular, the board 44 includes terminals (not illustrated) for electrical connection of the transformers. The circuitry 16, which is embodied as a processor, has an input to receive a control signal from a master control processor (not illustrated).

Referring to FIGS. 9 and 10, in a further example, the system 2 comprises the power supply 28 and four modules 60 (which are designated as 60A, 60B, 60C and 60D).

Each module 60 includes: a pair of applicator electrodes 18 and return electrodes 22 (which may be arranged as part of an applicator unit and a return unit respectively as illustrated in FIGS. 3 and 4); a waveform shaping system 33 (shown in FIG. 9) to control a waveform in electrical energy applied through a transmission circuit 12 comprising the applicator electrode 18, the return electrode and a plant 14 (illustrated in FIG. 3 or 4), and; module electrical circuitry 62 (shown in FIG. 9), which is arranged to control the waveform shaping system 33, and; a transformer 34 (shown in FIG. 9).

A suitable example of one of the modules 60 is provided as the board 44 discussed in association with FIG. 9, which includes optional additional components such as the filter 40.

In variant embodiments, which are not illustrated: the modules have more than one pair of applicator electrodes and return electrodes; the modules may omit the transformer, in such an embodiment, a single transformer or other converter can be implemented as part of the power supply, such that the electrical energy is supplied to the modules at the desired voltage, and; the modules are implemented with multiple transformers (that are connected at the low and/or high voltage sides) and waveform shaping systems, as exemplified by the embodiments discussed in association with FIGS. 6-8.

Figure 11:
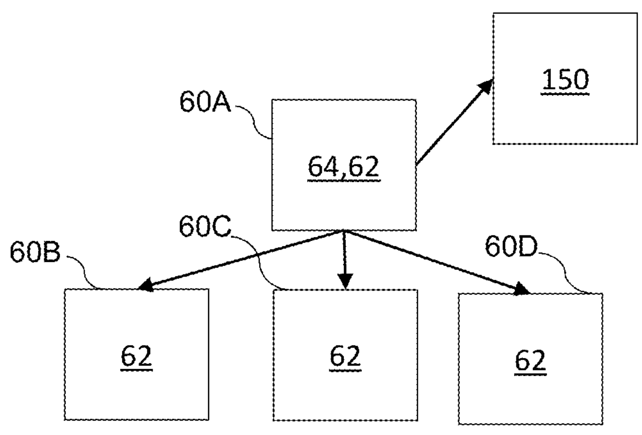
FIG. 11 is a schematic diagram showing electrical circuitry of the system of FIG. 10.

Referring to FIG. 11, the system 2 further includes master electrical circuitry 64 to control the module electrical circuitry 62 to apply the electrical energy in a synchronised manner so that elements of the output of the modules are in some way controlled/synchronised relative to each other as opposed to an arbitrary output between the modules, examples of which will be discussed. The master electrical circuitry 64 is implemented as the electrical circuitry 62 the module 60A.

The master electrical circuitry 64 includes a master processor and the module electrical circuitry 62 of each module includes a slave processor. The master processor provides a control signal to the slave processors for synchronised control of the output. The control signal includes a clock signal for synchronisation. The control signal further includes information for control of pulse width modulation (PWM), which may include a signal of a particular frequency that is used for or to synchronise part of the waveforms.

In variant embodiments, which are not illustrated, the master processor is implemented as a dedicated unit, which is separate from the modules.

Figure 12:
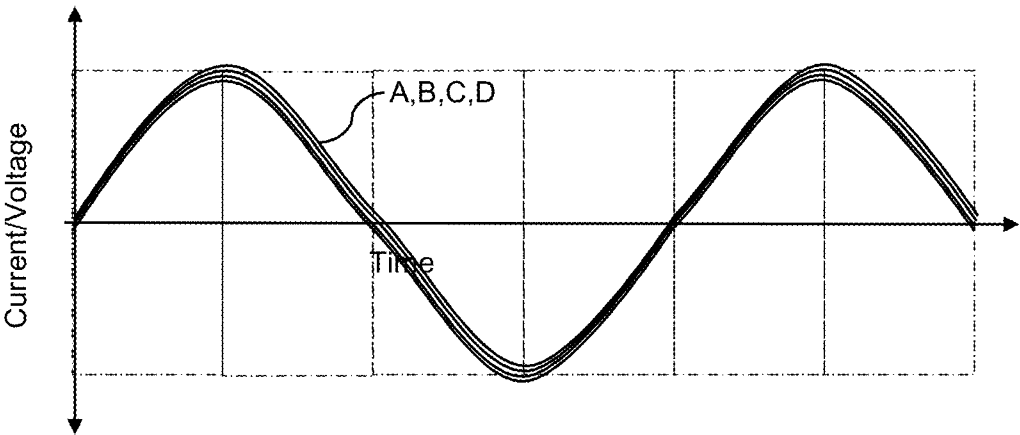
FIGS. 12-14 are graphical diagrams showing an electrical energy output of the modules of FIG. 10.

Referring to FIG. 12, in a first example of the synchronised output, the output of modules 60A-60D is illustrated as respective curves A-D. The curves A-D are all in phase such that they rise and fall at the same time and have the same period.

With such an arrangement, the applicator electrodes and return electrodes can be positioned in close proximity of each other since the precise control reduces the likelihood of electrical arcing between transmission circuits.

Figure 13:
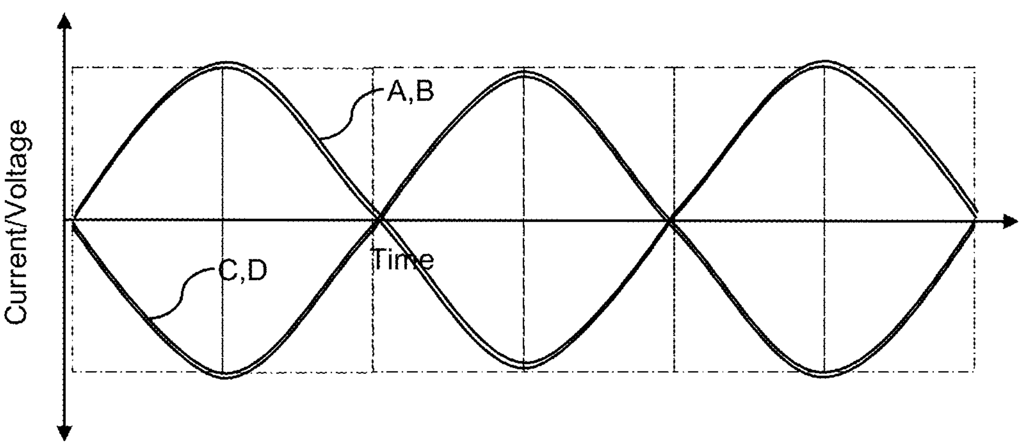

Referring to FIG. 13, in a second example of the synchronised output, the output of modules 60A-60D is illustrated as respective curves A-D. A first group comprising the curves A and B are in phase such that they rise and fall at the same time. A second group comprising the curves C and D are all in phase such that they rise and fall at the same time. However the first group is in anti-phase with the second group, such that the first group peaks when the second group troughs etc.

With such an arrangement, the applicator electrodes and return electrodes of the groups can be positioned in close proximity of each other, however the groups require separation from each other to avoid electrical arcing between the electrodes of different groups. Such an arrangement may be easier to drive than the first example since the power draw is more uniform with respect to time.

Figure 14:
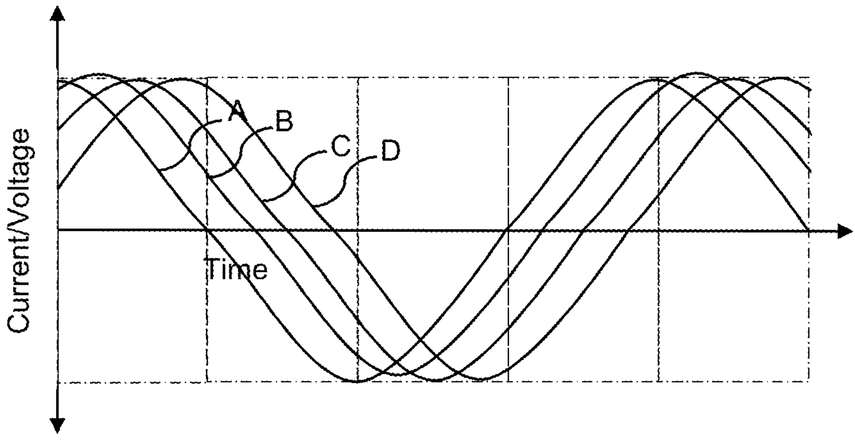

Referring to FIG. 14, in a third example of the synchronised output, the output of modules 60A-60D is illustrated as respective curves A-D. The curves A-D are controlled to be out of phase and staggered such that they rise, peak, fall and trough sequentially within a predetermined time of each other.

Such an arrangement may be easier to drive than the first or second example, since the power draw is more uniform with respect to time. Whilst the curves are all offset by the same amount of time from earth the, other offsets may be implemented.

Although the above examples illustrate sine waves, other shaped waveforms can be implemented for each of the examples, including as: square waves; sawtooth; ramped square wave at the rising and/or falling edge; combinations of said waveform shapes; pulsating examples of said waveshapes, e.g. for a square wave that pulses from zero, rather than a negative current/voltage, and; or other shapes. For a square wave, the antiphase relationship can be implemented such that the first group is on (i.e. pulsating) when the second group is off (e.g. at zero current/voltage, rather than a negative current/voltage).

In the above examples, the waveforms are controlled to have the same period (or pulse width). In variant embodiments, the periods may be different, e.g. such that a period of one module or group of modules is an integer of another module or group of modules etc.

Although four modules have been exemplified, it will be understood that the principles of the examples can be extended to include other numbers of modules, including 3 or 10 etc. This can include additional modules added as module E, F etc. which are controlled in a similar fashion, or additional modules added under model A for example (or other group) and controlled in the same manner as module A, such that module A refers to a group of modules.

Control of the waveform shape is achieved by the module electrical circuitry 64, 62 implementing PWM control of the MOSFET 33. In variant embodiments, other control is implemented, including:

pulse code modulation (PCM); direct control of amplitude based on a target amplitude, and; other control techniques.

In embodiments, the master electrical circuitry 64 (or other electrical circuitry of the system) is configured to prevent output of electrical energy of a group of one or more modules based on a determined condition of the system 2. Said control can be implemented in combination with the above first to third examples of synchronised output (e.g. as the synchronised output) or separately.

The determined condition of the system includes one or more of the following:

In a first example, the determined condition of the system is based on an electrical arc detected at the applicator or return electrodes of the module. The electrical arc may be between the plant, ground or other electrode etc. An example of a suitable system for determining an arc is provided in WO2020182818. Such disclosure may be incorporated herein.

In a second example, the determined condition of the system is based on an output power or current of the power supply 28 (or an power or current of a module) crossing a threshold. The threshold may be a selected based on a maximum safe power output of the power supply 28, which can be stored in an electronic memory of the electrical circuitry and determined by known current and voltage sensors.

In a third example, the determined condition of the system is based on an electrical continuity between one or both electrodes of a module and the ground having crossed a threshold. An example of a suitable system for determining electrical continuity is provided in WO2016162667, which is based on a continuity signal. Another example of determining electrical continuity is provided in GB2111564.7A, which alternatively determines continuity based on physical contact between an electrode and the ground. Such disclosures may be incorporated herein.

In a fourth example, the determined condition of the system is based on a temperature of a return unit or an applicator unit of a module as having crossed a temperature threshold. An example of a suitable system is disclosed in GB2111564.7A.

In a fifth example, the determined condition of the system is based on a plant not being determined as present. An example of a suitable system is disclosed in WO2021233892, which discloses the use of electrical energy through the transmission circuit to determine if a plant is present or a camera system etc.

Figure 15:
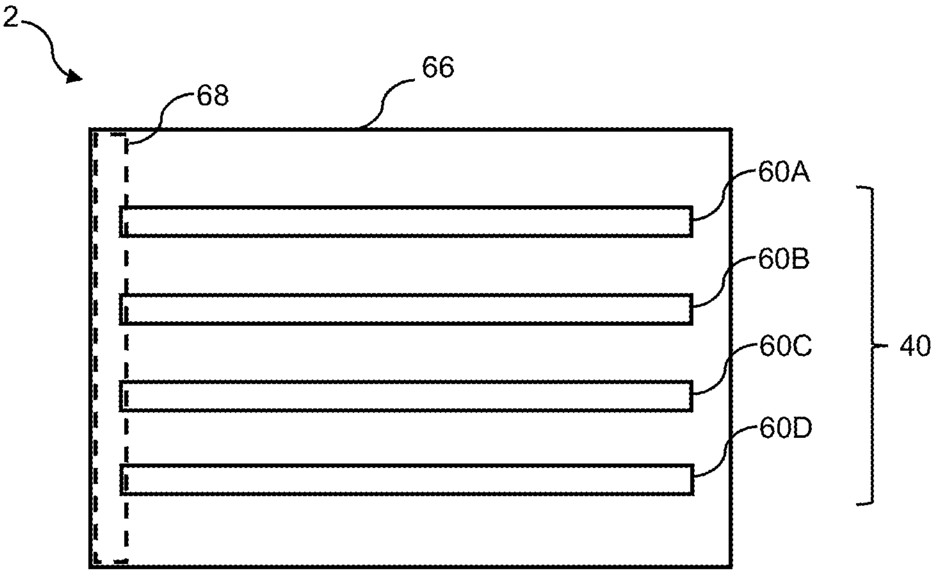
FIG. 15 is a schematic diagram showing an arrangement of the boards of FIG. 9 and a chassis arranged as the system of FIG. 10.

Referring to FIG. 15, the modules 60A-D are each arranged as the boards 44 as discussed for FIG. 9, and the boards 44 are supported by a chassis 66. By arranging the modules on the same configuration boards 44, they may be conveniently added or removed from the chassis 66 to adapt the capability of the system 2, e.g. when more or less outputs are required.

The chassis 66 includes an electrical connection 68 to the power supply 28 (not shown in FIG. 15). The electrical connection 68 can be connected to the boards 44 automatically as part of the connection of the boards to the chassis. For example, a mechanical docking interface (not illustrated) to connect the boards to the chassis includes or has associated therewith an electrical supply interface (not illustrated) that electrically connects the boards to the electrical connection 68.

In an example, the boards slide into an electrical interface that is arranged as a plug and socket, and the mechanical interface includes mechanical fixings, such as bolts or screws, between the chassis and boards. Examples of such connections are provided for graphics and other cards on base station PCs etc. In a further example, the aforedescribed mechanical interface is provided and the user manually connects the plug and socket.

In embodiments, the master electrical circuitry 64 (or other general electrical circuitry 16 arranged as part of the system 2) is arranged to store on electronic memory (not illustrated) position information on a positional arrangement of the applicator 18 and/or return electrodes 22 of the modules 60. The position information can include coordinates by a suitable reference system, e.g. cartesian or polar coordinates to determine a location of an electrode in 2 or 3 dimensional space.

Figure 16:
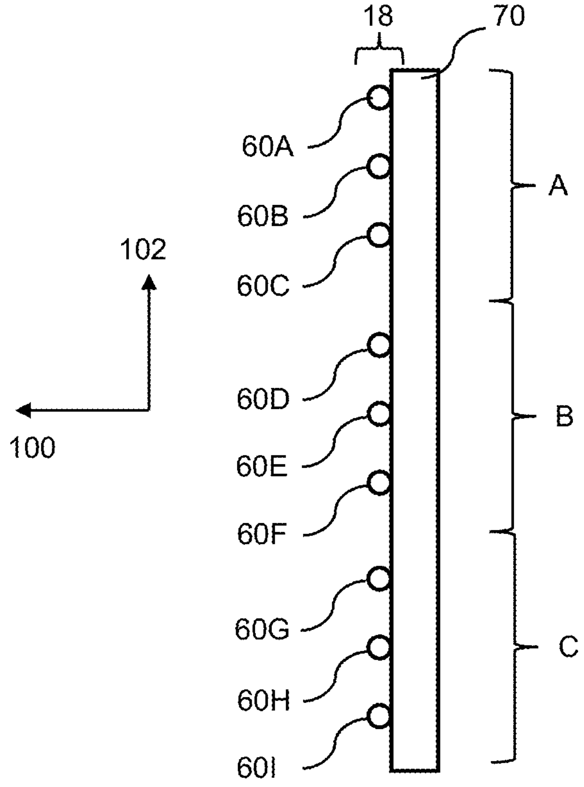
FIG. 16 is an illustrative diagram/user interface output showing an arrangement of electrodes of the modules of the system of FIG. 10 on an implement for towing by an agricultural or other vehicle.

The position information may be used by the electrical circuitry in one or more of the following or other ways:

In a first example, a user may be notified of the positional arrangement via a user interface (e.g. a display), which is in electronic communication with the electrical circuitry (e.g. a peripheral device) or forms part of the electrical circuitry. Referring to FIG. 16, the notification in an example is graphical and a representative position of the electrodes 18 is shown overlaid with a representative image of an implement 70 to which the electrodes 18 are mounted. A module identifier (shown as 60A-60*i*) is also displayed. Based on the displayed positional arrangement, the user can conveniently assign the modules to groups (e.g. for the same control throughout the group) via the user interface. For example, first A, second B and third C groups can be assigned to left, centre, and right lateral positions of electrodes 22 in a lateral direction 102, which is perpendicular to a longitudinal direction 100 along which the implement 70 is moved over the plants in use (e.g. by an agricultural vehicle such as a tractor). The assigned groups of modules may then be stored by the master electrical circuitry 64.

In a variant, which is not illustrated, the user can also manually assign modules to groups without the notification of the positional arrangement.

In a second example, as a variant of the first example instead of the user manually assigning groups to the module, the electrical circuitry is configured to automatically assign groups (e.g. for the same control throughout the group) to the modules based on the positional arrangement. For example, and for any electrodes that have a lateral distance within the lateral dimensions of the left position are assigned to the left group etc.

In a third example, the electrical circuitry is configured to provide a notification to a user via the user interface if a position of an electrode is determined as less that a threshold of another (which may be a predefined distance to avoid electrical arcing). For example, in an active system with a position determination system (as will be discussed), if a position of an electrode changes, then a user may be conveniently notified in case of a dangerous operating condition.

The position information may be provided by the electrical circuitry in one or more of the following ways:

In a first example, the position information is provided by the user manually via the user interface.

In a second example, referring to FIG. 12 the electrical circuitry 16, 64 implements a position determination system 150 to determine automatically, e.g. in real time, a position of the electrodes 18, 22.

The position determination system 150 includes position sensors (not illustrated) associated with the electrodes 18, 22. The position sensors are arranged on or in operative proximity to the electrodes such that meaningful position information is provided.

The position sensors can be implement as GPS transmitters with a corresponding receiver in communication with the electrical circuitry 16, 64. Alternatively, the position sensors can be implemented as RFIDs with UHF real-time location systems (RTLSs) including ultra-wideband RTLS or as another suitable system.

In other embodiments, the position determination system is arranged as a camera system with image processing to determine a location of the electrodes, and; other suitable implementations.

The determined position of the electrodes can be processed by the electrical circuitry (e.g. automatically) to determine if adjoining electrodes are within a predetermined distance from each other and based on this criterion (or another criteria) the electrical circuitry can automatically assign the modules to groups and/or select a type of synchronisation control allowable for a module, as will be discussed:

In a first example, for electrodes which are determined as arranged to directly adjoin each other and which are determined as less than a predetermined distance away from each other (such that electrical arcing may be an issue) then modules may be assigned to the same group, such that they are controlled in phase with each other.

In a second example, for electrodes that are determined as arranged greater than a predetermined distance from each other, the assignment to different groups may be permitted such that they can be operated out of phase with each other.

In a third example, for electrodes that are determined as arranged less than a predetermined distance from each other, a waring notification may be provided to a user interface associated with the electrical circuitry and/or the system 2 may be inoperable. In a partial example, said warning may be provide if the return and applicator electrodes of a module are too close to each other, such that the electrical energy is likely to short over them rather than travel though a plant.

Referring back to FIG. 16, in an embodiment, the modules 60A-I are arranged into three groups A (60A-C), B (60D-F), C (60G-I), based on a position in the lateral direction 102 of the electrodes 18, 22, and each group is independently controllable (e.g. a group can be operational to supply electrical energy when the others groups are not). A user interface (not illustrated) in electrical communication with or as part of the electrical circuitry receives receive a command from the user to apply electrical energy to any one or more of the groups A, B, C. This enables particular areas of plants to be targeted.

In variant embodiments the electrical circuitry may automatically determine which group to operate based on the previously described system for determining if a plant is present. Moreover, a group of modules may optionally be controlled in a synchronised manner as discussed preciously.

It will be appreciated that any of the disclosed methods (or corresponding apparatuses, programs, data carriers, etc.) may be carried out by either a host or client, depending on the specific implementation (i.e. the disclosed methods/ apparatuses are a form of communication(s), and as such, may be carried out from either 'point of view', i.e. in corresponding to each other fashion).

Furthermore, it will be understood that the terms "receiving" and "transmitting" encompass "inputting" and "outputting" and are not limited to an RF context of transmitting and receiving radio waves. Therefore, for example, a chip or other device or component for realizing embodiments could generate data for output to another chip, device or component, or have as an input data from another chip, device or component, and such an output or input could be referred to as "transmit" and "receive" including gerund forms, that is, "transmitting" and "receiving", as well as such "transmitting" and "receiving" within an RF context.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

As used herein, any machine executable instructions, or compute readable media, may carry out a disclosed method, and may therefore be used synonymously with the term method, or each other.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

LIST OF REFERENCES

- 2 Electrical apparatus
  - 4 Electrical energy supply unit
    - 28 Power supply
    - 32 Electrical energy processing unit
      - 33 Wave form shaping/Switching system
      - 34 Electrical transformer
  - 6 Applicator unit
    - 18 Applicator electrode
    - 20 Body
      - 56 Extension
  - 8 Return unit
    - 22 Return electrode
    - 24 Body
  - 10 Electrical energy
  - 30 Supply electrical energy
  - 12 Transmission circuit
  - 16 Electrical circuitry
    - 62 Module electrical circuitry
    - 64 Master electrical circuitry
  - 44 Board
  - 60(A-D) Module
  - 66 Chassis
    - 68 electrical connection
  - 70 Position determination system
- 14 Plant
- 26 Ground

The invention claimed is:

1. A system to electrically kill a plant or at least attenuate plant growth, the system comprising:

a plurality of modules, each module comprising: one or more pairs of an applicator electrode and a return electrode, and; module electrical circuitry to control a waveform shaping system to control a waveform in electrical energy applied through a transmission circuit comprising the applicator electrode and the return electrode of said pairs, the modules arranged to receive electrical energy from a power supply, and;

master electrical circuitry is configured to control the module electrical circuitry to apply the electrical energy for each module in a synchronised manner relative to the other modules.

2. The system of claim 1, wherein each module comprises a step-up converter arrange to increase a voltage of the electrical energy applied to the transmission circuit compared to a voltage of the electrical energy supplied from the power supply unit.

3. The system of claim 2, wherein the step-up converter is an electrical energy transformer.

4. The system of claim 1, wherein the synchronised manner comprises that a phase of the electrical energy for each module is controlled relative to each other in some manner as opposed to arbitrary output that is independent of each other.

5. The system of claim 4, wherein the synchronised manner comprises one or more of the following:

control of a first group of one or more of the modules to output electrical energy in phase from the electrical energy output of a second group of one or more of the modules;

control of a first group of one or more of the modules to output electrical energy in anti-phase from the electrical energy output of a second group of one or more of the modules;

control of groups of one or more of the modules to stagger the output of the electrical energy from other group of one or more of the modules.

6. The system of claim 5, wherein the staggered output comprises a plurality of groups of one or more modules controlled to apply their outputs to be out of phase so that they rise, peak, fall and trough sequentially within a predetermined time of each other to reduce power demands on the power supply unit.

7. The system of claim 1, wherein the system comprises electrical circuitry configured to limit the electrical energy output by a group of one or more modules based on a determined condition of the system, wherein said determined condition of the system includes one or more of:

an electrical arc is detected at the applicator or return electrodes of a module;

an output power or current of the power supply unit or a power or current of a module has crossed a threshold;

an electrical continuity between one or both electrodes of a module have crossed a threshold;

the return unit or applicator unit of a module is determined as having crossed a temperature threshold;

a plant for treatment not being determined as present.

8. The system of claim 1, wherein the modules are arranged into groups based on a location of the electrodes, and each group is independently controllable to apply electrical energy, wherein the system includes a user interface to receive an input to operate a group of modules and the master electrical circuitry is arranged to receive said input and operate the associated group.

9. The system of claim 1, wherein the master electrical circuitry includes a master processor and the module electrical circuitry includes a slave processor and the master processor provides a control signal to the slave processor.

10. The system of claim 8, wherein the control signal includes a clock signal for synchronisation and the waveform shaping system controls the waveform by pulse width modulation and the control signal includes information for control of said modulation.

11. The system of claim 8, wherein the master processor is implemented as one of the processors of the modules.

12. The system of claim 1, wherein the modules are each arranged on a board, and the boards are supported by a common chassis wherein the common chassis includes an electrical connection to the power supply, and the boards are removably attached to the common chassis.

13. The system of claim 1, wherein the power supply is arranged as a single unit that supplies the modules or as multiple units, each of which supplying one or more of the modules.

14. The system of claim 1, wherein the master electrical circuitry is arranged to store position information on a positional arrangement of the applicator and/or return electrodes of the modules, and to:

assign the modules to groups based on said positional arrangement, and/or provide a notification to a user via a user interface if a position of an electrode is determined as less that a threshold of another.

15. The system of claim 14, wherein the master electrical circuitry includes a user interface, and the user interface is configured to provide the position information based on a user input, and/or;

the system includes a position determination system, which includes position sensors associated with the electrodes, and the position determination system is configured to provide the position information based on information from the position sensors.

16. The system of claim 1, wherein the master electrical circuitry includes a position determination system, which includes position sensors associated with the electrodes, and the position determination system is configured to provide positional information based on information from the position sensors, wherein the position information is provided to a user via a user interface, and the user is able via the user interface to assign groups to the modules based on said positional arrangement.

17. The system of claim 1, wherein the applicator electrodes are arranged for transmission of the electrical energy by direct contact with a portion of the plant above the ground.

18. The system of claim 1, wherein the earth electrode is arranged to receive the electrical energy directly from the plant or from the plant via the ground.

19. The system of claim 1, wherein the module electrical circuitry is arranged to control the waveform shaping system to generate a waveform in the electric energy which is sinusoidal or square or a combination thereof.

20. The system of claim 19, further comprising a filter system arranged to filter the electrical energy from the waveform shaping system to a step-up converter, the filter arranged not pass or to at least partially attenuate frequencies is in the electrical energy above a frequency of the waveform.

21. The system of claim 19, wherein the module electrical circuitry is arranged to control the waveform shaping system by pulse width modulation.

22. The system of claim 19, wherein the module electrical circuitry is arranged to control the electrical energy:

to have a waveform with a frequency of above 500 Hz or 1 kHz;

a voltage of at least 1 kV, and a maximum of 70 kV, and;

an electrical current of at least 10 mA rms.

23. The system of claim 1, wherein the waveform shaping system of each module includes an electrically operated switch, which is arranged as a MOSFET.

24. A method of controlling electrical energy of a system to electrically kill a plant or at least attenuate plant growth, the method comprising:

controlling via master electrical circuitry and module electrical circuitry, an electrical energy output of a plurality of separate modules to output said electrical energy in a synchronised manner, wherein said modules comprise the module electrical circuitry to control a waveform of the electrical energy and an applicator electrode and a return electrode.

25. Electrical circuitry to implement the method of claim 24.

* * * * *